United States Patent [19]

Degnan et al.

[11] 4,300,439
[45] Nov. 17, 1981

[54] BALLISTIC TOLERANT HYDRAULIC CONTROL ACTUATOR AND METHOD OF FABRICATING SAME

[75] Inventors: William G. Degnan, Huntington; Robert A. Selleck, Trumbull, both of Conn.

[73] Assignee: United Technologies Corporation, Hartford, Conn.

[21] Appl. No.: 73,832

[22] Filed: Sep. 10, 1979

[51] Int. Cl.³ .................. F01B 1/00; F16J 11/04; F16J 15/18
[52] U.S. Cl. .................. 92/146; 92/168; 92/171; 89/36 A
[58] Field of Search .............. 92/171, 169, 170, 168, 92/151; 89/36 R, 36 A

[56] References Cited
U.S. PATENT DOCUMENTS

| | | | |
|---|---|---|---|
| 1,528,097 | 3/1925 | Cooper | 92/171 |
| 3,884,127 | 5/1975 | Simmons | 92/151 |
| 4,073,219 | 2/1978 | Bimba | 92/171 |
| 4,122,759 | 10/1978 | Runkel et al. | 92/168 |
| 4,211,151 | 7/1980 | Wallischeck | 92/146 |

*Primary Examiner*—Paul E. Maslousky
*Attorney, Agent, or Firm*—Vernon F. Hauschild

[57] ABSTRACT

A ballistic tolerant control actuator of the hydraulic cylinder-piston type and having a hybrid housing comprising a structural outer wall of selected characteristics and wall thickness "t", a central sleeve snuggly fitted within the outer wall and being of selected characteristics and selected wall thickness so that when the outer wall is impacted and/or penetrated by a projectile of diameter D, impact induced stress waves from the outer wall pass into the central sleeve with sufficient intensity to locally disintegrate and clear the central sleeve in the vicinity of the projectile impact, and so that the petals formed in the outer wall will not project farther radially inwardly than the petals which would be formed in the most critical case by a projectile whose diameter D produced the ratio $t/D = \frac{1}{3}$. The hybrid housing also includes an inner wall snuggly fitted within the central sleeve and being of selected characteristics such that the portion thereof adjacent the cleared central sleeve portion will be cleared therewith and so that any petals ballistically formed therein will be easily cleared by piston motion.

26 Claims, 10 Drawing Figures

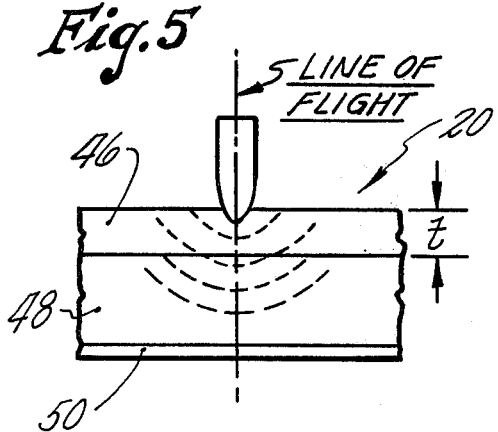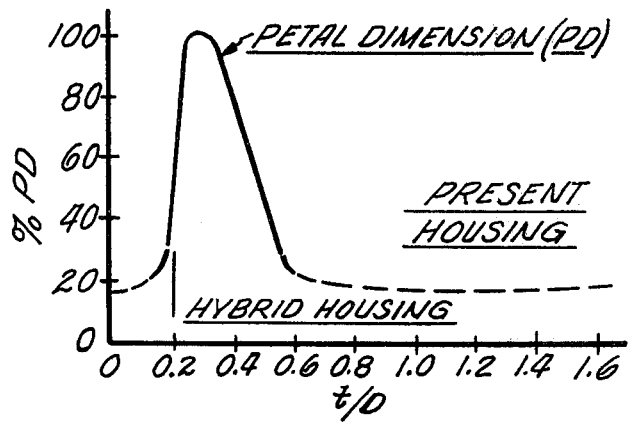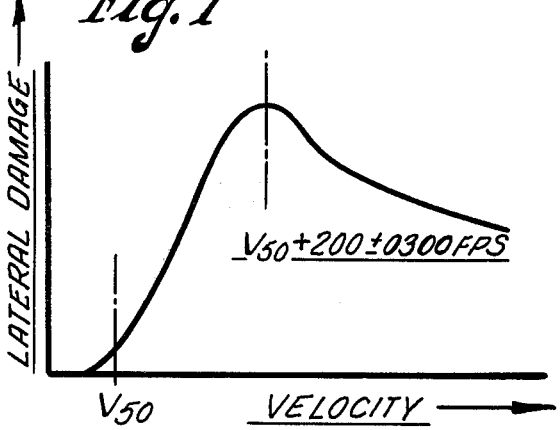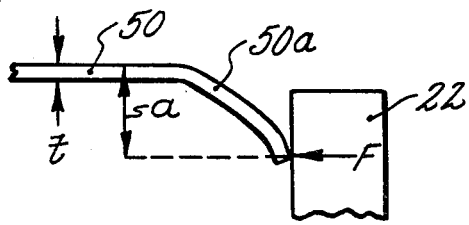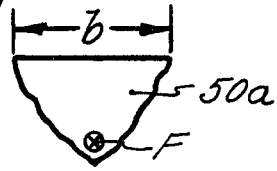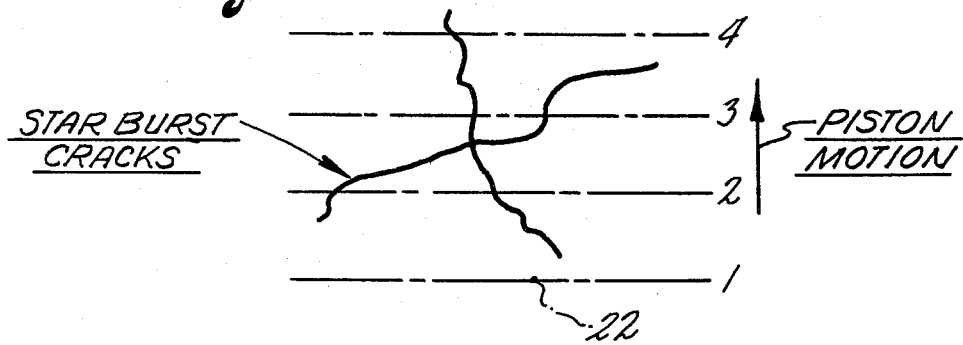

BALLISTIC TOLERANT HYDRAULIC CONTROL ACTUATOR AND METHOD OF FABRICATING SAME

CROSS REFERENCE TO RELATED APPLICATIONS

Some of the subject matter of this application is disclosed and claimed in U.S. patent Application Ser. No. 073,833 filed on even date herewith entitled Ballistically Tolerant Control System in the names of William G. Degnan and John D. Fansler.

BACKGROUND OF THE INVENTION

1. Field of Invention

This invention relates to control mechanism and more particularly to a control hydraulic actuator that performs the control function by selectively positioning a piston, or other movable member, within a cylinder, and with the free end of the piston rod extending through the cylinder wall to produce the control motion. Such controls are conventionally used in aircraft and other vehicles in which jamming of the piston within the cylinder would produce control malfunction. One possible cause of piston jamming within the cylinder is the striking of the cylinder by a projectile in flight wherein the ballistic damage caused by such a projectile in striking and/or passing through the control cylinder displaces cylinder material so as to impede piston motion or cause piston jamming.

2. Description of the Prior Art

In the flight control art, attempts have been made in the past to reduce or eliminate the ballistic vulnerability of a flight control by fabricating the cylinder and/or piston as armor utilizing conventional armor-plate techniques. Such armor construction is shown in Sliney U.S. Pat. No. 3,566,741 which teaches tubular armor plate formed from an impact-resistant outer armor shell and a slightly softer inner armor shell. Such constructions proved to be unreasonably heavy and large and therefore are unacceptable for aircraft use. Further, they proved not to provide the desired ballistic-proof result.

Although not necessarily in the flight control art, the prior art is replete with patents which perform the function of armor, that is, to defeat the projectile to prevent its passing through the article. Some examples of such prior art are Jahn U.S. Pat. No. 3,977,294, Kelsy U.S. Pat. No. 3,962,976, Poole U.S. Pat. No. 4,061,815, Hoover U.S. Pat. No. 4,048,365, McArdle U.S. Pat. No. 3,924,083, Eichelberger U.S. Pat. No. 3,324,768, Burges U.S. Pat. No. 3,813,281, Dawson U.S. Pat. No. 3,826,172, VanLaetham U.S. Pat. No. 3,930,452, and Sheridan U.S. Pat. No. 2,391,535.

The U.S. Pat. No. 3,577,306 to Baker utilizes polymer laminates to prevent petaling, and this is contrary to the teaching of our invention that provides space for the petals to enter without jamming the piston.

Simmons U.S. Pat. No. 3,884,127 teaches such a control in which both the piston and the cylinder gland, through which the piston rod extends, are fabricated so as to be shearable so as to prevent piston or piston rod jamming. The Simmons patent has the disadvantage, however, that such flight controls are required to be tested to demonstrate that their structural integrity is such that they can withstand, without rupture or permanent deformation, 2.5 times the normal operating pressure which causes the piston to reciprocate within the cylinder. This test requirement dictates that the area of the piston must be at least $2\frac{1}{2}$ times the area of the cylinder gland to be able to demonstrate such structural integrity and still result in a cylinder gland which is shearable under normal operating conditions. This requirement that the piston area be at least $2\frac{1}{2}$ times the gland area results in a control of larger envelope and a greater weight than would otherwise be necessary. This envelope and weight problem is added to by the fact that larger hydraulic chambers formed by such a piston require the use of more operating fluid, with the attendant requirement for a larger fluid supply and dispensing system. In addition, such a large piston generates larger-than-normal operating forces that must be reacted by the remainder of the control system so that the remainder of the control system must be correspondingly strengthened, further increasing the weight problem. Bell U.S. Pat. No. 4,122,759 is similar to Simmons.

Wallischeck U.S. Pat. No. 4,211,151 teaches a concept of enveloping the piston rod or lining the cylinder bore of a hydraulic cylinder-piston mechanism in a control system with a sleeve of a material that is either frangible or deformable so that ballistic impact will cause disintegration or deformation thereof, and so that other deformed materials may move into the space left by the disintegrated sleeve or so that other moving parts may further displace the ballistically displaced material so as to permit the piston to continue moving within the sleeve following ballistic damage. Our invention is an improvement over Wallischeck in that it teaches a hybrid housing for the hydraulic cylinder comprising outer and inner walls with a central sleeve member positioned therebetween, each of selected material and dimension to perform the jam-proof function predictably and repeatably while utilizing minimum weight and space.

SUMMARY OF THE INVENTION

A primary object of the present invention is to provide a ballistic tolerant hydraulic actuator for a control system utilizing a hydraulically actuated piston or other movable member within a hydraulic cylinder, which cylinder-piston can withstand required test loads and which cylinder has a hybrid housing comprising a structural outer wall member capable of withstanding the loads imposed thereon by the actuator function, a central sleeve member snugly fitted therewithin and of selected properties and dimension, and an inner wall member snugly fitted within the central wall member and all bonded to produce an integral hybrid housing.

It is a very important teaching of the present invention that the wall thickness of the central sleeve is at least the thickness of the maximum outer wall petal depth which occurs at $t/D = \frac{1}{3}$, where t is the thickness of the outer wall member and D is the diameter of the threat projectile that comes closest to satisfying this equation among all anticipated threat projectiles and projectile velocities.

It is still a further object of this invention to teach an actuator in which the outer wall member thickness is dictated by the fatigue or other strength requirements of the actuator system, and in which the outer wall is made of material having a fracture toughness that is sufficiently low that the outer wall petals are of reasonable depth yet the fracture toughness is sufficiently high to satisfy the system strength, inspection, and fatigue requirements, and whose fracture toughness and fatigue or other strengths properties are as nearly equal as possible in both radial and circumferential directions to obtain uniform petaling with respect to direction, and whose ultimate tensile strength and acoustic impedance ratio with the central sleeve are such that the stress waves generated in the outer wall by projectile impact and penetration are imparted to the central sleeve with sufficient intensity to cause the central sleeve to disintegrate in the location of projectile impact so as to locally clear the central sleeve to permit outer wall petaling into the area so cleared in the central sleeve, but not such that the central sleeve is destroyed to the point that actuator jamming occurs because of any cocking of the piston.

It is still a further object to provide such a hybrid housing in which the outer wall is the primary structural member.

It is a further object of this invention to teach such an actuator whose hybrid cylinder housing central sleeve consists of either laminates, particulates, or lamellae of selected material such that the central sleeve has a low tension strength with respect to stress waves traveling radially inwardly thereinto from the outer wall, and which central sleeve has high compressive load carrying capability with respect to radially outwardly directed loads imparted thereagainst by the hydraulic fluid.

It is still a further object of this invention to teach such a hybrid housing in which a series of ballistically induced initial compressive stress waves pass from the outer wall radially inwardly through the central sleeve material so that a portion of each initial wave is reflected at the interface between the central sleeve and the inner wall to proceed radially outwardly as a compressive stress wave through the central sleeve material, while the remainder of each initial wave passes through the inner wall to be reflected from the inner wall free surface and to pass radially outwardly through the inner wall and the central sleeve as a tension stress wave, so that said compressive and said tensile stress waves coact to clear central sleeve material and inner wall material in the projectile line of flight.

It is still a further object of this invention to teach such a hybrid housing wherein ballistic impact or ballistic penetration of the outer wall will produce four forces coacting to disintegrate the central sleeve and inner wall portions in the projectile line of flight, namely, radially inwardly traveling compressive stress waves generated in the outer housing, radially outwardly traveling compresive stress waves reflected from the interface between the central sleeve and inner wall, radially outwardly traveling tensile stress waves reflected from the inner wall free inner surface, and hydraulically induced compressive stresses.

It is still a further object of this invention to teach such a hybrid housing in which the inner wall performs the function of presenting a hard wear surface for the piston member to act against and also serves as a chemical insulator for the central sleeve.

It is still a further object of this invention to teach such a hybrid housing in which the inner wall is of low fracture toughness so as to be easily cleared by ballistic impact with the central sleeve.

It is still a further object of this invention to teach a hybrid housing in which the inner wall is made of material that is sufficiently brittle and sufficiently isotropic that a uniform pattern of straight-edged small petals are formed therein away from the area of central sleeve destruction.

It is still a further object of this invention to teach such a housing in which the inner wall has low residual stress whereby any petals formed therein ballistically result from straight-line star-burst cracks so that the petals will be cleared by the piston one-at-a-time resulting in substantially constant and minimal petal-clearing loading of the piston.

It is still a further object of this invention to teach a hybrid housing in which the outer wall is made of VIM/VAR 4340 steel, i.e. vacuum induction melt-/vacuum arc remelt 4340 steel, the central sleeve is made of either bonded graphite laminates, epoxy bonded particulate grit, or lamellae of sprayed molybdenum, and wherein the inner wall is made of electroformed nickel of a wall thickness between 0.010 to 0.030 inches.

It is still a further object of this invention to teach such a hybrid housing in which the electroformed nickel inner wall is chrome plated and ground to final size, and in which the central sleeve is of laminate construction and joined to the roughened periphery of the inner wall by a primer that penetrates the inner laminates so that, after curing, the inner laminates so penetrated and the inner wall portion are cleared together by projectile impact and penetration, or form easily cleared petals.

It is an object of this invention to teach a servo housing that is functional, readily producible, and has a high probability of not jamming due to ballistic damage.

It is a further object of this invention to teach such a housing that is filled with hydraulic fluid so that projectile impact on the housing causes stiffening of the housing by hydraulic ram in the hydraulic fluid.

It is a further object of this invention to teach such a hybrid housing that can permit a 14.5 millimeter projectile to pass therethrough without losing mobility and that is 15 percent lighter than prior art steelwalled housings, and that is 440 percent lighter than the prior art type steel walled housing that would be necessary to defeat the projectile in armor fashion.

Other objects and advantages of the present invention may be seen by referring to the following description and claims, read in conjunction with the accompanying drawings.

BRIEF DESCRIPTION OF THE DRAWINGS

FIG. 5 is a partial, enlarged, cross-sectional showing of the wall of the hybrid housing illustrating the initial effect thereon of projectile impact, initial penetration, and stress waves.

FIG. 6 is a graph constituting a plot of percent petal dimension (PD) plotted against the ratio t/D, where t is the hybrid housing outer wall thickness and D is the diameter of the threat projectile or projectiles.

FIG. 7 is a graph illustrating the general effect of projectile velocity on outer wall petal depth.

FIG. 8a is a showing of a petal ballistically formed in the inner wall of the hybrid housing of this invention to illustrate the force required for servo piston clearance thereof following ballistic damage.

FIG. 8b shows the petal in end view.

FIG. 9 is a showing of a star-burst crack pattern in the inner wall of the hybrid housing to illustrate how piston motion will clear the petals formed therefrom one-at-a-time.

DESCRIPTION OF THE PREFERRED EMBODIMENT

The invention will be described in the environment of hydraulic actuators in an aircraft control system, but it will be evident to those skilled in the art that the actuators could be controlled by any type of fluid, could be used to control any mechanism under control, that instead of tandem cylinder-piston mechanisms as disclosed the backup mechanism could be end-to-end cylinder piston mechanisms of any variety of prime mover, such as an electric motor or a manually operated lever. Further, while the actuator is described as a typical hydraulic cylinder piston mechanism, rather than a reciprocating piston the movable member could well be of any type such as a rotatable member within the hydraulic cylinder to move with respect thereto to perform the control function or any combination of rotation and translation required, as in an electric actuator with a screw or worm drive.

Figure 1:
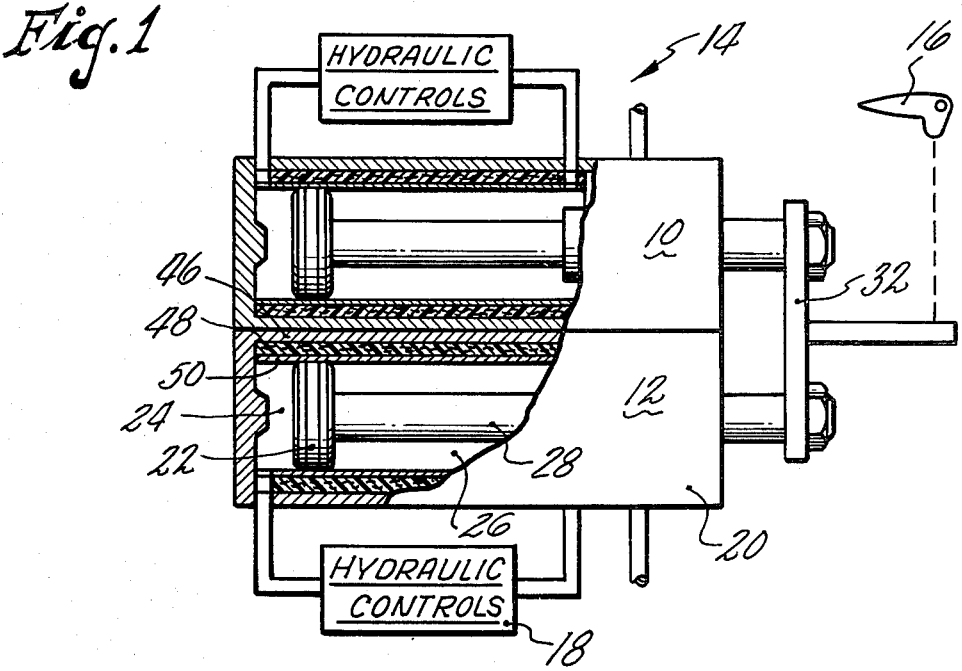
FIG. 1 is a showing, partially broken away, of actuators in tandem utilizing the hybrid housing and acting in control fashion to selectively position an airfoil surface.
Figure 2:
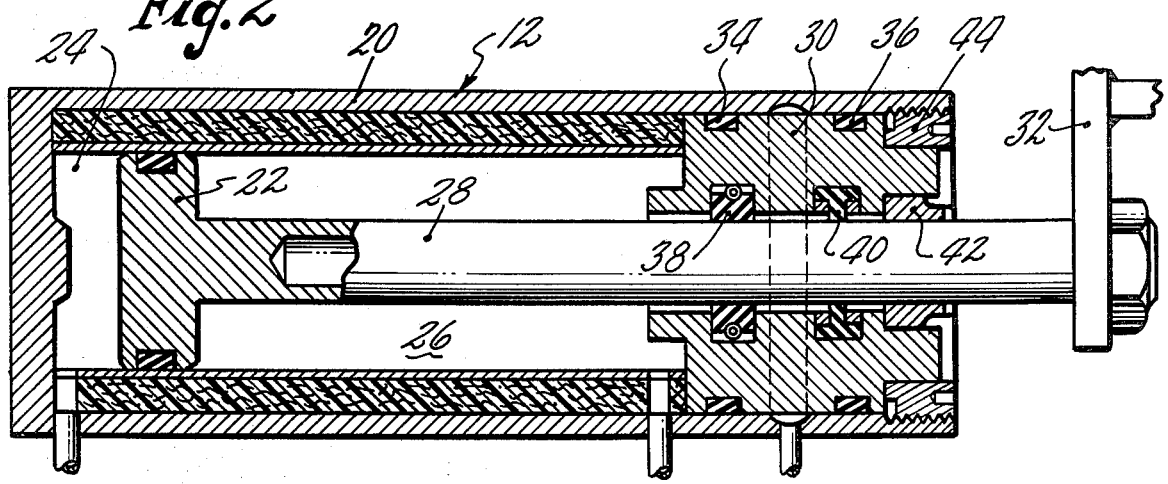
FIG. 2 is an enlarged cross-sectional showing of an actuator utilizing the hybrid housing.

Referring to FIG. 1 we see tandem actuators 10 and 12 forming part of flight control system 14 serving to selectively position flight control member 16 in accordance with the dictates of the flight control system that includes the hydraulic controls 18 illustrated. In our preferred embodiment actuators 10 and 12 are identical so that actuator 12 only will be described. Actuator 12 (see FIG. 2) includes cylindrical housing 20, which is a hybrid housing and will be described in greater particularity hereinafter. Hybrid housing 20 envelopes piston 22 so as to form chambers 24 and 26 on opposite sides thereof to selectively receive hydraulic operating fluid under pressure from hydraulic controls 18 so as to cause piston 22 to reciprocate within hybrid housing cylinder 20. Piston rod 28 projects from piston 22 in conventional fashion and extends through cylinder wall member 30 so that its free end projects to the exterior of cylinder 20 to be connected, together with the piston rod from actuator 10, to plate member 32, which is, in turn joined in conventional fashion to element 16 under control. Wall member 30 includes conventional seals 34, 36, 38 and 40, and wiper ring 42, and is held in position by retaining nut 44. It will be evident to those skilled in the art that end wall or gland 30 of actuator 12 shown in FIG. 2 could be replaced by the frangible gland disclosed in Bertea U.S. Pat. No. 3,884,123.

It will be obvious to those skilled in the art that in a control mechanism 14 shown in FIG. 1, actuators 10 and 12 can be hydraulically controlled in conventional fashion to operate together to selectively position control surface 16, that control surface 16 can be controlled by either actuator 10 or 12 and that, with either actuator 10 or 12 ballistically damaged, control surface 16 can be controlled by the undamaged actuator so long as the ballistic damage to the damaged actuator does not cause piston jamming. To avoid such piston jamming due to the ballistic damage, hybrid housing cylinder 20 is utilized and will now be described.

Figure 3:
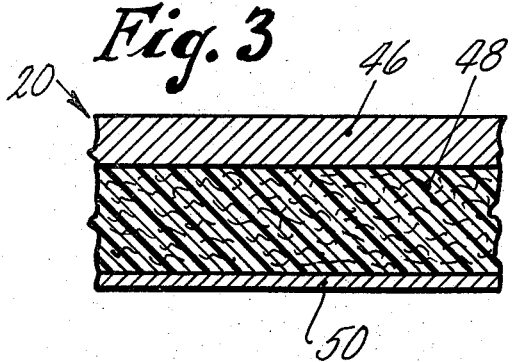
FIG. 3 is a partial, enlarged, cross-sectional showing of the wall of the hybrid housing included for purposes of discussion.
Figure 4:
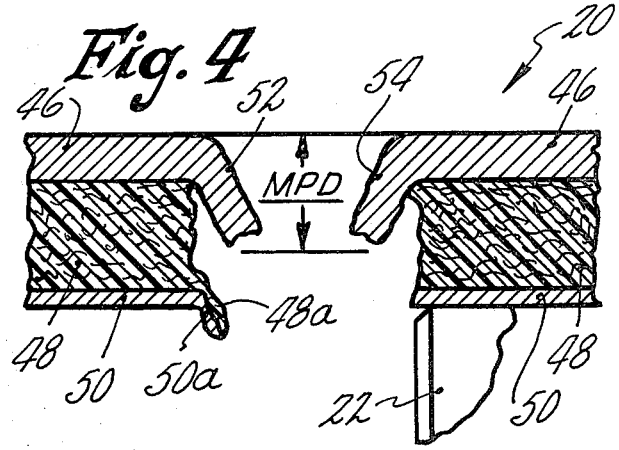
FIG. 4 is similar to FIG. 3 but shows a partial wall section of the hybrid housing illustrating its condition following projectile impact and penetration thereof, and passing therethrough so as to form petals in the outer wall member that are received in the cleared portions of the central sleeve and inner wall, that is shown to be either fully or partially inner-wall petal-cleared.

For purposes of illustration and description an enlarged section of hybrid housing 20 is shown in FIG. 3 and consists of outer wall 46, central sleeve 48 and inner wall 50 snugly sleeved and bonded together so as to form an integral wall, but with the geometry and material used in fabricating outer wall 46, central sleeve 48, and inner wall 50 selectively chosen so as to coact to prevent piston jamming should a projectile impact and be defeated or impact, penetrate, and pass through hybrid housing 20. The objective to be achieved is shown in FIG. 4 wherein the impacting, penetrating, and passing of a projectile through outer wall 46 has generated stress waves in the outer wall that are imparted to the central sleeve 48 and inner wall 50 with sufficient intensity to cause the portions of central sleeve 48 and inner wall 50 in the vicinity of projectile impact to disintegrate and be cleared so as to permit outer wall petals, such as 52 and 54 to project radially inwardly into the area cleared in members 48 and 50 but to a selected maximum petal depth$_{(MPD)}$, which does not exceed the thickness of central sleeve 48 and inner wall 50 so that, following ballistic damage, piston 22 can continue to reciprocate jam-free within hybrid housing 20 utilizing the motive force imparted thereto by the second actuator, or other types of mechanisms described supra. The motion of piston 22 will clear any petals 50a ballistically formed in inner wall 50.

To best understand the significance of the construction of hybrid housing 20, reference will be made to FIG. 5 to describe the effect thereon of projectile impact and penetration. As used herein, projectile impact, projectile impact and penetration, and projectile impact, penetration, and passing through are to read as producing the same results. When the projectile impacts and penetrates the outer wall 46 as shown in FIG. 5, a series of pressure waves, called stress waves, is generated in the outer wall and, due to the selected acoustic impedance ratio (AIR) between the outer wall 46 and the central sleeve 48. These stress waves pass through the interface therebetween and into central sleeve 48 with sufficient intensity that the radially directed pressures (i.e. compressive and tensile) imposed upon central sleeve 48 by the stress waves passing therethrough causes central sleeve 48 to disintegrate and be cleared in the vicinity of projectile impact, and to clear with it the inner wall portion adjacent the area of projectile impact so as to achieve the result shown in FIG. 4. This result is that with the projectile having passed through hybrid housing 20, central sleeve and inner wall portions immediately adjacent the impact region have been cleared so that the petals formed in outer wall 46 by the impacting penetration and passing of the projectile through hybrid housing 20 produces outer wall petals of less maximum petal depth (MPD) that the combined wall thickness of central sleeve 48 and inner wall 50, thereby permitting piston 20 to reciprocate within the housing without jamming.

More specifically, upon ballistic impact, the stress waves in outer housing 46 are compressive in sign and travel inwardly in a radial direction. The materials selected for outer housing 46 and central sleeve 48 are such that the magnitude of the initial compressive stress waves that pass into that central sleeve 48 is large enough in the direct line-of-flight of projectile to pulverize both graphite laminates and the epoxy bonding material, when central sleeve 48 is made of the preferred laminate construction described hereinafter. In areas away from the projectile's line-of-flight, the graphite laminates will remain intact but the epoxy bonding material will be pulverized by the passing of this compressive waves radially inwardly therethrough. When each compressive wave gets to the innermost point of central sleeve 48, some of it is transmitted through the interface into the inner wall 50 and some of it is reflected by the interface to become a compressive stress wave traveling radially outwardly. The portion of the compressive wave which passes into the inner wall 50 hits the inner wall's free internal surface and is reflected as a tensile stress wave, since the sign of the stress wave reverses when reflected at a free surface. It will therefore be seen that there are now two reflected stress waves acting on the central sleeve material, first the compressive wave that was reflected at the interface between the central sleeve and the inner wall, and the tensile wave that was reflected at the free internal surface of the inner wall. These waves are very close together and may be treated as a doublet. The amplitude of the reflected tensile wave is nearly the same as the original compressive wave, about 5 percent less, and in passing back through the already damaged structure of the central sleeve serves to peel back the already delaminated graphite layer and further adds to the area of delamination. Subsequent stress waves all behave in the same manner and therefore extend the laminate peeling, epoxy bond crushing, laminate peeling modes of failure successively farther outwardly from the projectiles line-of-flight. This wave reversal concept is more fully explained in the publication entitled "Stress Waves in Solids" by H. Kolsky, Copyright 1963, and published by Dover Publications, Inc. of New York. The material of the inner wall 50 is selected so that the initial ballistically-induced stress wave transmits sufficient tensile stress to the inner wall after reflection that the stress amplitudes are slightly higher than the ultimate strength of the inner wall material so that the inner wall fails first, in a starburst eminating from the point where the line-of-flight intersects the inner wall. These star-burst cracks remain relatively straight and any inner wall petals produced ballistically therefrom will be cleared by the servo piston one-at-a-time. This results in substantially constant and minimal petal-clearing loading of the piston.

The successive passing of compressive waves and tensile waves across the ballistically-delaminated central sleeve laminates will cause them to break in bending at the point where the lamination ends. The material of inner wall 50 is of sufficient fracture toughness that the petals formed therein, due to the aforementioned starburst initial cracks (see FIG. 9), will usually not be fully cleared by bending fracture with the central sleeve laminates, but will be cleared by motion of the piston therepast thereafter. Such inner wall petals are shown to have been cleared on the righthand side of FIG. 4 but such inner wall petal 50a and central sleeve inner laminate 48a bonded thereto have not yet been cleared in the FIG. 4 showing and, may or may not be cleared by piston 20 depending upon the magnitude of the piston stroke.

It is an important teaching of this invention that hybrid housing outer wall 46, central sleeve 48, and inner wall 50 be selectively dimensioned and are made of selected materials so that the result of such projectile damage thereto is as illustrated in FIG. 4, thereby avoiding piston jamming. These three elements 46, 48, and 50 of hybrid housing will be considered individually to bring out the importance of their dimensioning and the material selected in fabricating them.

The thickness (t) of outer wall 46 is dictated by the fatigue or other strength requirements of the system in which the actuator 12 is to be used, since outer wall 46 is the principal load carrying member of hybrid housing 20, central sleeve 48 and inner wall 50 being basically non-structural member. It is important that outer wall 46 be fabricated of a material which will generate the desired shock wave amplitude upon projectile impact and a sufficient portion of that amplitude transmitted to the central sleeve 48 and inner wall 50 to produce the desired clearing result to permit outer wall petal penetration. The factors that determine the intensity of the stress waves which are imparted to central sleeve 48 from outer wall 46 due to projectile impacting thereof are, first, the ultimate tensile strength (UTS) of the outer wall 46, and the manner in which ballistic loading rate increases that apparent strength and, second, the acoustic impedance ratio (AIR), or K, between the outer wall 46 and central sleeve 48 materials. The AIR must be sufficient that central sleeve 48 is removed (cleared) by the stress waves in the vicinity of projectile impact but not such that the central wall 48 is damaged to the extent that piston 20 is jammed.

The equation for acoustic impedance ratio is:

$$AIR = \rho_2 c_2 \div \rho_1 c_1$$

where $\rho_2$ is the density of the central wall member, $c_2$ is the speed of sound in the central wall member 48, $\rho_1$ is the density of outer wall 46 and $c_1$ is the speed of sound in the outer wall 46.

The below equation applying AIR to this case is applicable to those stress waves transmitted normal to the interface between the outer wall and central sleeve and defines the amplitude of the stress wave in the central sleeve in terms of pressure ($P_2$):

$$P_2 = \left[ \frac{2\rho_2 c_2}{\rho_2 c_2 + \rho_1 c_1} \right] P_1$$

Where $P_1$ is the amplitude in the outer wall material $P_2$ is the amplitude in the central sleeve material.

Our experience has shown that a value of $P_2$ which is four to five times greater than the tensile ultimate of the central sleeve binder (epoxy resin) will cause sufficient damage to the central sleeve to produce sufficient damage volume in the central sleeve to allow petals from the outer wall to intrude without further deleterious consequences. Our experience has further shown that material combinations resulting in a value of $P_2$ fifteen to twenty times the ultimate tensile strength of a particulate binder will result in such gross central sleeve member damage that a finite risk is run of a jam because insufficient central sleeve and inner wall material is left to guide the piston and a jam due to cocking of the unguided piston might occur. Those skilled in the art will be able to combine materials that form lower amplitude stress waves (titanium, for example) with improved acoustic impedance center sleeve 48 materials (for example, Boron, Carbide grit bonded with epoxy adhesive, the particulate central sleeve material resulting in $P_2$ fifteen to twenty times the epoxy ultimate strength when the outer wall material was high-strength steel) to achieve the same result.

It has been our further experience that a state of radial compression in the central wall material will further reduce the extent of central wall material damage from the transmitted stress wave amplitude from the outer wall. The compressive stress state in the central wall material does not change the stress wave amplitude transmitted to any marked degree but does change the response of the central wall material. Our experience with empty servo housings and with servo housings filled with hydraulic oil indicates that the primary (basic) hybrid housing of high-strength steel outer member, graphite/epoxy central member, and electroformed nickel inner member will still perform in the manner described with this reduction in central wall material damage. The radial compressive state in the central wall material was induced by hydraulic ram induced, in turn, by impact of the projectile on the outer wall material.

It is further important that outer wall 46 be of sufficiently high fracture toughness (FT) to satisfy the system fatigue and strength requirements, but of sufficiently low fracture toughness (FT) so that the petals formed in the outer wall member by ballistic damage are not so long as to produce a maximum petal depth (MPD) that would cause piston jamming.

The fracture toughness of a material is the resistance of the material to a crack in a stress field. The longer the crack in a housing, the deeper the petal penetration. Accordingly, higher fracture toughness materials give deeper petals than lower fracture toughness materials.

It is further important that the fatigue properties of the outer wall be as nearly the same as possible in the longitudinal and circumferential directions to obtain a minimum weight outer wall. Tangential fatigue properties are important to this requirement. It is further important that the fracture toughness also be as nearly the same as possible in the longitudinal and circumferential directions to obtain as uniform petal dimensions after ballistic penetration as possible. As previously indicated, fracture toughness does influence petal dimension in that high fracture toughness does cause deeper petals (increased petal dimension), compared to low fracture toughness. In that same manner, gross changes in fracture toughness between longitudinal and circumferential directions would result in a preferred direction for formation of petals and could result in reduced capability to predict petal dimensions and required central wall thickness. The ability to predict maximum petal dimension is an important feature in the hybrid housing.

Concerning central sleeve 48, it is important that the sleeve have a weak tensile basal plane relative to other directions, that is, that it have low tensile strength in the radially inward direction. Under normal servo operating pressures and under initial passage of the compressive stress wave, the weak tensile basal plane will be under compressive loading. The normal servo operating pressures will not cause damage to the basal plane, since the induced stress is opposite to the weak direction. High compressive stress wave pressures, such as those occurring on initial, radially-inward, passage will crush the epoxy binder in the preferred laminate embodiment or in the particulate (epoxy-bonded Boron Carbide grit) but not in lamellae (flame-sprayed Molybdenum). To be generally applicable to all three central sleeve cases, laminates, particulates, and lamellae, the tensile, reflected, radially-outward stress wave should be understood to be the key cause of central sleeve 48 destruction. It sould be understood that in those central sleeve materials using epoxy as a binder, both compressive and tensile stress waves cause damage, previously described as a crushing-peeling-crushing failure mode. In the flame-sprayed Molybdenum, the primary failure mode is peeling with the crushing mode contributing significantly less (or practically nothing) to the failure mode which is the basic clearing action. Futher, central sleeve 48 should have good mechanical properties in the directions orthogonal to the radial direction so that deflections of the outer wall 46 under normal operating conditions will not induce strains which will cause undesirable reductions in those properties (i.e. cyclic-induced modulus changes or fatigue damage accumulation that would degrade performance of the servo system).

The purpose of and required characteristics of inner wall 50 is that it must be capable of protecting the material in central sleeve 48 from any undesirable effect that the hydraulic fluid may have thereon. This inner wall also acts as a base for a hard chrome plate that, in turn, acts as a wear surface for piston 22. This inner wall must have high ultimate tensile strength and corresponding high hardness, such as, $R_c$ 51.5, nominal. The inner wall material must be brittle and must have low residual stress properties, about -10 ksi compressive, since this low residual stress causes straight-line star-burst inner wall cracks to be formed therein by ballistic damage, the direction of the cracks in the star-burst being predictable so that, when inner wall petals are formed therefrom by ballistic damage, the piston head 22 must clear only one such petal at a time. This results in a fairly uniform plateau of clearing load requirement for the control system.

Electroformed nickel has been found to be a good material for inner wall 50. The electroformed nickel can be fabricated on a mandrel that can then be used as a tool in winding the laminates of central sleeve 48 thereon in production. This electroformed nickel can also be made in multiples of desired lengths, that allows the making of inner wall and central sleeve by automatic machinery and then cutting them off to length, and then removing the mandrel. Nickel also has high hardness, high strength, and relatively low elongation at failure. Its fracture toughness is also high because of the relative thinness of the inner wall 50. Nickel can be readily chrome plated for wear purposes, and this is very important in the construction of the hybrid cylinder in that it permits the fabrication of this multi-piece housing so that any deviations in tolerance caused by the build-up of the various parts can be compensated for in the plating process. In other words, following the assembly of the outer wall, central sleeve and inner wall, the inner diameter of the inner wall 50 is chrome plated and then ground so that the required tolerances are achieved in the final grinding operation. Further, we have found that with a nickel inner wall, the two inner plies of central sleeve laminate, such as graphite laminates, adhere tenaciously to the nickel despite the action of the ballistically imparted stress waves passing therethrough. This is an advantage in piston-clearing the few nickel petals that are not cleared with the exploding central liner. The nickel inner wall is either cracked or over-strained at the point where the stress wave delaminated graphite ends, and will therefore break in a brittle manner. This makes the clearing of the nickel petals much easier as the piston head passes thereby following ballistic damage. The lower residual stress in the nickel leads to a predictable pattern of star-burst cracks. It can be shown that the primary petal clearing loads are caused by the failure in bending of the inner wall 50 petals that have not been cleared by ballistic damage, as follows:

Failure Stress = MC ÷ I where, as best understood by referring to FIGS. 2a and 2b M equals the failing moment, i.e., force F X petal length a C equals one-half thickness t of wall 50 and $50a, = \frac{1}{2}t$, and I equals $bt^3 \div 4$, where b is the petal 50a base moment Substituting:

Failure Stress = $(2a/b) (F_2/t)$ where 2a/b is a constant

It will therefore be seen that the failing stress in nickel inner liner 50 is inversely proportional to the square of the nickel liner thickness t.

A micro-second-by-micro-second analysis of the state of the stress waves in the outer housing and central sleeve was conducted through 0.031 inches of projectile penetration of the outer housing. By that stage of penetration, a minimun of seven stress waves existed in the outer housing and central sleeve and the degree of damage in the central sleeve appeared so severe that further analysis was unnecessary. This demonstrated that the central sleeve is severely damaged and is starting to displace at that stage of penetration. Our study revealed that the central sleeve and inner wall have no influence on the petal formation of the outer housing, since the maximum petal formation appears to occur during the final stages of penetration of the projectile through the outer housing when the central sleeve and inner wall have been destroyed. We also determined that successive stress waves appear to be formed in the outer housing when initial stress waves are reflected from the interface between the outer housing and central sleeve and also from the free surface of inner wall 50, leading to an overload condition when the back-reflective waves add to the stresses caused by further penetration of the projectile into the outer housing. Hoop tension stresses in the outer housing are high enough at some stage in the penetration to cause tensile cracks, longitudinal and tangential, before the stress waves cause a shear failure in the radial direction, thereby resulting in typical plug-out failure seen in ballistic penetrations. Our testing confirmed that the final stages of projectile penetration in the outer housing controls petal dimensions in our actuator/hybrid housing construction. Stress waves from hydraulic ram do not appear to be appreciable in the outer housing until partial penetration of the housing by the projectile, however, as the projectile penetrates deeply into the outer housing wall the stress state in the outer housing, due to hydraulic ram, results in appreciably less housing deformation (out of roundness) and smaller effective petal depth. We have further demonstrated that this hydraulic ram effect reduces the total area of the central sleeve and inner wall which are destroyed since the hydraulic ram places the inner wall and central sleeve under large steady, radial compressive stresses as the tensile stress waves cause the central sleeve and inner wall to explode locally.

To give examples of specific materials which we have found satisfactory for use in hybrid housing 20, we have found that outer wall 46 may be made of VIM/VAR 4340 steel which is a double vacuum melted steel having an ultimate tensile strength (UTS) of between 200 and 220 ksi, and a fracture toughness of 120 ksi in a longitudinal direction and 80 ksi in a transverse direction as more fully explained in Navy Report (NAEC-AML-1947-21 May 1964). Outer wall 46 could also be produced from 300 M alloy having an ultimate tensile strength in the range of 260 to 280 ksi. Data of VIM/VAR 4340 and 300 M may be found in MIL-HDBK-56 or Structural Alloys Handbook or any of several materials properties handbooks and they may be purchased in raw material form from any of several qualified raw material vendors.

Central sleeve 48 is made of selected material so as to be locally frangible or locally explodable in response to stress waves for clearing the material thereof. Central sleeve 48 can be made of laminates, particulates, or lamellae. If the central wall 48 is to be made of laminates, graphite/epoxy laminates may be hand or machine wound at any selected angle and bonded for this purpose, and it is preferable to seal the cut end faces of the graphite with a material to prevent hot hydraulic oil from degrading the epoxy binder. A thin layer of electrodeposited nickel would be typical of such sealing materials.

If central sleeve 48 is to be made of particulate, we find that aluminum oxide ($Al_2O_3$) or Boron Carbide ($B_4C$) grit that has been epoxy-bonded and cured, is satisfactory for this purpose. If central sleeve 48 is to be made of lamellae construction, we find that molybdenum powder may be heated into molten form and then flame sprayed so as to form individual, joined lamallae or platelets of molybdenum built-up to the necessary wall thickness of the central sleeve member. If the central sleeve 48 is to be made of laminates, we found it important that a primer such as metlbond 6726 be utilized between the roughened outer surface of inner wall 50 and the laminates so as to penetrate the inner laminates so that, following curing, a strong and compliant bond is formed between the inner laminates and the inner wall. This bond serves to clear with the inner laminates due to the ballistically generated stress waves or causes the inner wall to be over-stressed in bending, locally, by the attached laminates so as to aid in clearing of any inner wall petals that may remain. We have found electroformed (chemically-deposited) nickel to be a good material to be used as inner wall 50. The thickness of the electroformed nickel in inner wall 50 should be between 0.010 and 0.030 inches for optimum clearing forces but may be either thicker or thinner depending on specific applications.

The electroformed nickel has sufficiently lower residual stress and is sufficiently ductile that any petals that may be formed therein due to ballistic damage may be cleared by piston 22 with a reasonable clearing force.

In practice, we have found that a typical hybrid housing 20 utilizing a VIM/VAR 4340 steel of 200–220 ksi and of thickness 0.126 inches, a laminated grapite/epoxy central sleeve of 0.354 inches, and a electroplated nickel inner wall of 0.030 inches proved quite satisfactory.

Our work in this area has revealed that there is a very important relationship in the depth of a petal formation caused in the outer wall 46 by ballistic damage and the ratio of the thickness of the outer wall "t" and the diameter "D" of the threat projectile. We have determined that the maximum petal depth (MPD) occurs when the ratio t/D (dimensionless) equals about Δ, regardless of, but not independent of, projectile velocity. Smaller or larger projectiles than the one whose diameter D forms the critical ratio t/D = Δ will produce less petal dimension. It will therefore be realized that the main threat to piston jamming due to ballistic damage occurs when the ratio $t/D = \Delta$, since maximum petal dimension (MPD) (FIG. 4) occur at this ratio. This MPD dimension occurring at $t/D = \Delta$ dictates the thickness of the central sleeve 48 required to prevent the outer wall petals from projecting radially inwardly thereof so as to jam the piston.

The significance of this criticality and its importance in designing actuators, such as servos, using the hybrid housing taught herein, will be appreciated by viewing FIG. 6. At the present time it can be shown that the diameter of the various projectiles offering a threat to modern day aircraft are 5.56, 7.62, 12.7, 14.5, 20.0, 23.0, 30.0 and 37.0 millimeters. FIG. 6 is a graph of the ratio $t/D$ plotted against percent of petal depth (% PD) and it will be noted that maximum petal depth (MPD) occurs when $t/D$ equals about one-third. It will further be noted that $t/D$ ratios both smaller and larger than $\Delta$ produce less petal depth. 100 percent petal depth (MPD) was 0.454" for our actuator.

The importance of our finding that 100 percent MPD occurs at $t/D$ equals $\Delta$ lies in the fact that it applies to all materials, all projectiles, all velocities, and all obliquities.

An important function that the FIG. 6 graph performs is that the actuator designer can determine from this graph what his maximum petal dimension (MPD) is going to be. If the wall thickness of central sleeve 48 is that dimension or greater, no piston jamming problems will be encountered, whereas, if central sleeve wall dimension is less than that dimension, piston jamming can be expected. From a practical standpoint, however, the thickness of the central sleeve wall must also be considered from a weight standpoint. Accordingly, it would not be reasonable to avoid piston jamming by making the central sleeve wall thickness excessively thick because such would produce a very heavy actuator. The graph shown in FIG. 6 is a very important design tool because the actuator or servo inner diameter if fixed by the function that the actuator must perform, and hence this fixes the inner diameter of the inner wall 50. Our work determined the thickness (between 0.010 and 0.030") that the electroformed nickel inner wall 50 should be and hence that dimension is fixed. The thickness "t" of the outer wall 46 is dictated by the fatigue requirements of this load carrying member and therefore is determined using conventional analytical procedures. Therefore knowing outer wall thickness t and the diameter(s) of the threat projectile(s), the designer therefore knows the $t/D$ ratio(s) of interest and can use FIG. 6 to determine the maximum petal depth that the actuator will encounter. This maximum petal depth (MPD) will determine the wall thickness of central sleeve 48 that will be required to accommodate that MPD without piston jamming as shown in FIG. 4.

The velocity of the projectile has a very definite effect upon lateral damage and petal depth generated by projectile impact, penetration, and passing therethrough. This is illustrated in FIG. 7. It will be noted by viewing FIG. 7 that when VIM/VAR 4340 steel is used for outer wall 50, the projectile velocity that produces the greatest lateral damage to the housing, and hence the greatest petal depth due to ballistic damage, is at approximate projectile velocity $V_{50} + 200$ to 300 feet per second, where $V_{50}$ is the projectile velocity where 50 percent of the projectiles are defeated by the target.

The hybrid housing taught herein is 15 percent lighter than the current steel housings used in actuators, such as servos, and, if the current actuator housings were to be sized so as to become armor to overcome a projectile, the weight of such a "brute force" housing would be 4.4× the weight of our hydrid housing.

It will be evident to those skilled in the art that the teaching concerning our hybrid housing could also apply to the piston rod 28, but in reverse order so that the outer and inner walls are reversed to be on opposite sides of the central sleeve and, therefore, a projectile that strikes and passes through the hollow piston rod 28 produces petals upon entering that present no jamming problem with respect to end wall 30 because they are directed away therefrom, but petals produced by the projectile on the opposite side upon leaving the hollow piston rod 28 are received in the cleared portions of the central sleeve 48 and the electroformed nickel inner wall and therefore present no jamming problems between end wall 30 and piston rod 28. With respect to the preferred method of manufacturing hybrid housing 20, we have found that inner wall 50 is best formed by electroforming nickel on a selectively sized mandrel, and chrome plating and grinding the inner wall 50 to final size as a final operation in fabricating the assembled hybrid housing. The outer wall 46 will be fabricated in conventional fashion of the wall thickness t required for load carrying strength. The graph shown in FIG. 6 will then be utilized to determine the maximum petal depth anticipated in view of the $t/D$ ratio expected to be encountered. This dimension will determine the thickness of central sleeve 48 and that central sleeve can be fabricated in conventional fashion of laminates, particulates, or lamellae as described above. Finally with central sleeve 48 snugly sleeved into outer wall 50, and inner wall 50 is snugly sleeved into central sleeve 48. The hybrid housing is cured in conventional fashion so that the three elements 46, 48 and 50 thereof are bonded together to form an integral or unitary cylindrical housing.

We wish it to be understood that we do not desire to be limited to the exact details of construction shown and described above, for obvious modifications will occur to a person skilled in the art.

We claim:

1. An hydraulic actuator comprising:
   (A) a movable member,
   (B) a hybrid housing enveloping said movable member and cooperating therewith to define at least one hydraulic actuating fluid chamber so that the movable member is movable with respect to the housing in response to hydraulic pressure in said chamber and including:
      (1) an outer wall of selected material and wall thickness "t" to satisfy actuator fatigue requirements,
      (2) a central sleeve of selected material snugly fitted into said outer wall and being of selected wall thickness, and,
      (3) an inner wall of selected wall thickness snugly sleeved into said central sleeve and being of selected hardness to be wear resistant to the wear of said movable member within said housing, and so that impacting or impacting and penetrating of the outer wall by a threat projectile of diameter D generates stress waves therein of sufficient intensity to be imparted therefrom into the central sleeve to locally disintegrate and clear the central sleeve portion in the area of projectile impact, and further so that said inner wall is of selected fracture toughness strength, thickness, and residual stress so as to be cleared together with said cleared central sleeve portion, and still further so that projectile diameter D forms a ratio t/D with outer wall thickness t closer to $\frac{1}{3}$ than any other threat projectile, and so that petals formed in the outer wall by the projectile passing therethrough are of less depth than the combined wall thickness of said central sleeve and said inner wall and will occupy a void left by said locally cleared central sleeve and inner wall portions, so that said movable member may move within said housing following such projectile damage, and (4) means to actuate said movable member within said housing following the occurance of such projectile damage.

2. An actuator according to claim 1 wherein said hybrid housing is a cylinder and said movable member is a cylindrical piston reciprocable in said housing.

3. An actuator according to claim 2 wherein said outer wall, central sleeve, and inner wall are bonded together.

4. An actuator according to claim 3 wherein said outer wall and said central sleeve are made of selected materials so that the acoustic impedance ratio between the outer wall material and the central sleeve material permits the stress waves generated in the outer wall by projectile impact and penetration to be imparted to the central sleeve with sufficient wave intensity that the stress waves imparted to the central sleeve will cause disintegration thereof adjacent the area of projectile impact but will not cause center sleeve damage therebeyond that would otherwise prevent movement of the movable member within the housing following projectile damage.

5. An actuator according to claim 4 wherein the ultimate tensile strength (UTS) of the outer wall is 200 ksi or higher and the acoustic impedance ratio between the outer wall and central sleeve material is sufficient that upon projectile impact and penetration of the outer wall, stress waves are generated in the outer wall and transmitted to the central sleeve as stress waves of intensity four to five time the UTS of the central sleeve material in a radially inward direction.

6. An actuator according to claim 5 wherein the combination of the ultimate tensile strength of the outer wall and acoustic impedance ratio between the outer wall and central sleeve materials results upon ballistic impact and penetration of the outer wall of a stress wave transmission to the central sleeve in the order of less than fifteen to twenty times the UTS of the central sleeve material in a radially inward direction.

7. An actuator according to claim 6 wherein the fracture toughness (FT) of the outer wall is sufficiently high to satisfy system strength requirements but sufficiently low that the outer wall petals formed by the impacting, penetration, and passage of a projectile therethrough are within the range of acceptable central sleeve wall thickness dimensions.

8. An actuator according to claim 7 wherein the outer wall is of selected material such that its fracture toughness is substantially the same in both radial and circumferential directions so as to obtain uniform petaling of the outer wall.

9. An actuator according to claim 8 wherein the outer wall is made of VIM/VAR 4340 steel and the maximum petal depth of the outer wall member material caused by a projectile impacting, penetrating, and passing therethrough occurs at projectile velocity approximately equal to $V_{50}+300$ fps, where $V_{50}$ is that projectile velocity where 50 percent of the projectiles are defeated by the outer wall, and the central sleeve wall thickness is at least equal to the outer wall maximum petal dimension so determined.

10. An actuator according to claim 1 or 8 wherein said central sleeve is of selected material having a low tensile strength when subjected to tensile stress waves reflected radially outward therein, having high compressive load carrying capabilities in a radial outward direction so as to be able to react pressurized hydraulic fluid loads therewithin without destruction, and also having strong orthogonal properties so that the central sleeve will not suffer damage when strained by the outer wall dimension changes under hydraulic pressure, and wherein the tensile stress induced in said central sleeve by reflected stress waves imparted thereto due to projectile impact of the outer wall are directed as tensile stresses, opposite to the hydraulically induced compressive stresses.

11. An actuator according to claim 1 in which said central sleeve is fabricated of laminates, particulates, or lamellae.

12. An actuator according to claim 1 wherein said central sleeve is made of concentric graphite laminates bonded together, or of particulate of epoxy-bonded and cured ceramic or intermetallic grit, or lamellae formed by spraying molton-molybdenum so as to form individual, joined molybdenum platelets built up to the desired central wall thickness.

13. An actuator according to claim 1, 8 or 12 wherein said inner wall is made of material of sufficiently low fracture toughness FT to be cleared with the cleared central wall portion and of sufficiently low residual stress that degree and orientation of any petals formed therein ballistically is repeatable.

14. An actuator according to claim 1 or 8 wherein said inner wall is made of material having a high fracture toughness due to its thin wall thickness and a residual stress in the range of $-6$ to $-10$ ksi.

15. An actuator according to claim 1 or 8 wherein said inner wall is made of material of selected brittleness and that is selectively isotropic so that uniform, small petals will be formed therein away from the area of destruction due to ballistic damage.

16. An actuator according to claims 1, 8 or 12 wherein said central sleeve is fabricated of bonded layers of laminates and the inner wall is bonded thereto by a primer that penetrates the inner laminates so that these penetrated inner laminates and the inner wall clear together in the area of projectile impact during ballistic damage, namely, radially inwardly traveling compressive stress waves generated in the outer housing, radially outwardly traveling compressive stress waves reflected from the interface between the central sleeve and inner wall, radially outwardly traveling tensile stress waves reflected from the inner wall free inner surface, and hydraulically induced compressive stresses, or the remaining petals are cracked or overstressed at the end of the laminate delaminated region, leading to lower clearing loads on the inner wall petals.

17. An actuator according to claims 1, 8 or 12 and wherein said inner wall is electroformed nickel.

18. An actuator according to claim 17 wherein the thickness t of the electroformed nickel inner wall and the inner wall petal clearing force F of the movable member actuating means are selected to satisfy the equation:

$$F > (K/t^2)$$

where K is a constant.

19. An actuator according to claim 17 wherein electroformed nickel inner wall is of wall thickness between 0.010 and 0.030 inches.

20. An actuator according to claim 17 wherein said inner wall of electroformed nickel is chrome-plated.

21. An actuator according to claim 17 wherein said outer wall is made of VIM/VAR 4340 steel having an ultimate tensile strength (UTS) of 200 to 220 ksi and a fracture toughness of 120 ksi in a longitudinal direction and 80 ksi in a transverse direction.

22. An actuator according to claim 4 wherein the specific acoustic impedance and ultimate tensile stress (UTS) between the outer wall and the central sleeve may be expressed by the formula:

$$\frac{P_2}{UTS_2} = \left[ \frac{2\rho_2 C_2}{\rho_2 C_2 + \rho_1 C_1} \right] \frac{UTS_1}{UTS_2} = 4 \text{ to } 5$$

wherein:
$P_2$ = stress wave amplitude (pressure) transmitted to central sleeve
$UTS_2$ = ultimate tensile strength in radial direction of central sleeve
$\pi_2 C_2$ = specific acoustic impedance of central sleeve
$\pi_1 C_1$ = specific acoustic impedance of outer wall
$\pi_1$ = mass density of the outer wall
$\pi_2$ = mass density of the central sleeve
$C_1$ = speed of sound in outer wall
$C_2$ = speed of sound in central sleeve
$UTS_1$ = ultimate tensile strength of outer wall.

23. A hydraulic actuator comprising:
(A) a movable member positioned within a housing and cooperating therewith to define at least one pressure chamber to receive hydraulic fluid to actuate the movable member within the housing,
(B) wherein said housing comprises:
(1) an outer wall of selected thickness t to satisfy actuator fatigue requirements,
(2) a central sleeve snugly sleeved into said outer wall and being of selected structural characteristics so that shock waves generated in said outer wall due to projectile impact and penetration are imparted to said central sleeve with sufficient intensity to locally disintegrate and clear said sleeve, and so that thickness of the central sleeve is at least equal to the depth of petals formed in the outer wall by a threat projectile of diameter D impacting, penetrating, and passing therethrough, and which threat projectile forms a ratio t/D nearer to ⅓ than any other threat projectile,
(C) means to actuate said movable member within said housing following the occurance of such projectile damage,
(D) means to provide a wear resistant and protective layer to the central sleeve inner surface without preventing actuation of said movable member within said housing following the occurance of such projectile damage.

24. A hydraulic actuator comprising:
(A) a movable member positioned within a hybrid housing and cooperating therewith to define at least one pressure chamber to receive hydraulic fluid to actuate the movable member within the housing,
(B) wherein said hybrid housing comprises:
(1) an outer steel wall of selected thickness t to satisfy actuator fatigue requirements,
(2) a central sleeve of bonded graphite laminates snugly sleeved into and bonded to said outer wall and being of selected structural characteristics so that stress waves generated in said outer wall due to projectile impact and penetration are imparted to said central sleeve with sufficient intensity to locally disintegrate and clear said sleeve, and so that the thickness of the central sleeve is at least equal to the depth of petals formed in the outer wall by a projectile, and wherein the wall thickness of the central sleeve is greater than the maximum petal depth formed in the outer wall by projectile impact and penetration of the threat projectile having a diameter D which forms a ratio t/D with outer wall thickness t closer to ⅓ than any other threat projectile,
(3) an inner wall of electroformed nickel sleeved into and bonded to the central sleeve so as to be cleared with the central sleeve and so that ballistically induced stress waves reflected therefrom also serve to clear the inner wall and central sleeve and weaken any petals left in the inner wall.

25. A hydraulic actuator according to claim 24 wherein said outer wall is made of VIM/VAR 4340 steel, of ultimate tensile strength 200 to 220 ksi, of fracture toughness 120 to 100 ksi (length of crack in inches)½ and a wall thickness about 0.125 inches, wherein said central sleeve is of wall thickness about 0.355 inches, and wherein said inner wall is of wall thickness between 0.010 and 0.031 inches.

26. The method of producing a ballistically tolerant hydraulic servo cylinder capable of having a projectile of diameter D pass therethrough so that the nature of the ballistic damage caused thereby will permit continued movement of the servo movable member within the cylinder, comprising the steps of:
(A) fabricating from a material having low residual stress a wear resistant inner wall of wall thickness about 0.030 inches or less and of a selected inner diameter required to permit the servo to perform its required function,
(B) producing an outer wall of selected wall thickness t which will carry the necessary loads without fatigue failure to permit the servo to perform its required function, and made of selected material so that the impacting, penetrating, and passing therethrough of a projectile of diameter D will set up stress waves therein to be transmitted therethrough and so that petals will be formed therein of selected maximum petal depth no greater than the petal depth experienced from the threat projectile producing the ratio t/D closest to ⅓, and
(C) producing a central sleeve member of material having low tensile strength in a radially inward direction so as to clear when subjected to stress waves imparted thereto from the outer housing and reflected therethrough from the inner wall, and having a wall thickness of at least the outer wall maximum petal depth, and
(D) sleeving the central sleeve between the inner and outer walls in snug fit relationship so that the central sleeve is in radial compression and bonding it to each wall.

* * * * *

UNITED STATES PATENT AND TRADEMARK OFFICE
CERTIFICATE OF CORRECTION

PATENT NO. : 4,300,439
DATED : November 17, 1981
INVENTOR(S) : William G. Degnan; Robert A. Selleck It is certified that error appears in the above-identified patent and that said Letters Patent is hereby corrected as shown below:

| | | | |
|---|---|---|---|
| Col. 12, | Line 65 | "$\Delta$" | should read --1/3-- |
| | Line 68 | "$\Delta$" | should read --1/3-- |
| Col. 13, | Line 3 | "$\Delta$" | should read --1/3-- |
| | Line 5 | "$\Delta$" | should read --1/3-- |
| | Line 19 | "$\Delta$" | should read --1/3-- |
| | Line 23 | "$\Delta$" | should read --1/3-- |
| Col. 17, | Line 32 | "$\pi$" | should read --$\rho$-- |
| | Line 33 | "$\pi$" | should read --$\rho$-- |
| | Line 34 | "$\pi$" | should read --$\rho$-- |
| | Line 35 | "$\pi$" | should read --$\rho$-- |

Signed and Sealed this

Eleventh Day of October 1983

[SEAL]

Attest:

GERALD J. MOSSINGHOFF

Attesting Officer    Commissioner of Patents and Trademarks